(12) United States Patent
Ates

(10) Patent No.: US 12,059,842 B2
(45) Date of Patent: Aug. 13, 2024

(54) DEVICE FOR ADDITIVE MANUFACTURING

(71) Applicant: Erkan Ates, Istanbul (TR)

(72) Inventor: Erkan Ates, Istanbul (TR)

(73) Assignees: Erkan Ates, Istanbul (TR); Muserref Oguz, Istanbul (TR)

( * ) Notice: Subject to any disclaimer, the term of this patent is extended or adjusted under 35 U.S.C. 154(b) by 234 days.

(21) Appl. No.: 17/611,581

(22) PCT Filed: May 31, 2019

(86) PCT No.: PCT/TR2019/050414
§ 371 (c)(1),
(2) Date: Nov. 16, 2021

(87) PCT Pub. No.: WO2020/242403
PCT Pub. Date: Dec. 3, 2020

(65) Prior Publication Data
US 2022/0242039 A1    Aug. 4, 2022

(51) Int. Cl.
*B29C 64/209*    (2017.01)
*B33Y 30/00*    (2015.01)

(52) U.S. Cl.
CPC ............ *B29C 64/209* (2017.08); *B33Y 30/00* (2014.12)

(58) Field of Classification Search
CPC ..... B29C 64/20; B29C 64/209; B29C 64/118; B33Y 30/00
See application file for complete search history.

(56) References Cited

U.S. PATENT DOCUMENTS

2017/0326773 A1* 11/2017 Gibson ................. B33Y 30/00
2018/0250878 A1*  9/2018 Isupov ................. B29C 64/209

FOREIGN PATENT DOCUMENTS

| CN | 109719941 A * | 5/2019 | |
|----|----|----|----|
| CN | 209051030 U | 7/2019 | |
| DE | 102015103377 A1 * | 5/2016 | ............ B33Y 30/00 |
| EP | 3231581 A1 | 10/2017 | |

* cited by examiner

*Primary Examiner* — Jerzi H Moreno Hernandez
(74) *Attorney, Agent, or Firm* — Bayramoglu Law Offices LLC

(57) ABSTRACT

A print head for an additive manufacturing includes a heating chamber for melting an additive manufacturing ink in a form of a filament, the heating chamber including a nozzle for extruding a molten additive manufacturing ink, and a filament inlet for being connected to a filament supply line; the print head further includes a cover outside the heating chamber and movable relative to heating chamber between a first position, wherein in the first position the nozzle is covered by the cover, and a second position, wherein in the second position the cover is distant from the nozzle such that the nozzle is not covered by the cover. The cover comprises a flexible surface to partly deform at contacting with the nozzle when in the first position. An additive manufacturing device with the print head is also provided.

12 Claims, 6 Drawing Sheets

DEVICE FOR ADDITIVE MANUFACTURING

CROSS REFERENCE TO THE RELATED APPLICATIONS

This application is the national stage entry of International Application No. PCT/TR2019/050414, filed on May 31, 2019, the entire contents of which are incorporated herein by reference.

TECHNICAL FIELD

The present invention relates to a device for additive manufacturing. In particular, the present invention relates to an additive manufacturing device including a simple printing head with effective leakage prevention.

BACKGROUND

In devices for additive manufacturing from polymeric filaments, heating chambers (100) are generally employed for being supplied with filaments to be heated to temperatures above their melting point. The molten material obtained by melting the filament, is extruded from a nozzle (110) to a printing zone (Z) where a 3D printed object (B) is formed by additive manufacturing. An example to such heating chambers (100) is schematically depicted in the FIG. 1A at a passive mode (first position) in which the nozzle (110) is blocked by a pin (200), and in the FIG. 1B at an active mode (second position) in which the pin (200) is retracted from the nozzle (110) to unblock a flow of the molten material therethrough. As visualized in FIG. 1A, the pin (200) serves for prevention of any undesired spilling of the molten material from the nozzle (110) in the passive mode.

As the pin (200) is a moving and delicate mechanical part, such heating chambers (100) are rather difficult to produce (thus expensive), and can be considered to have a short service live.

For reversibly blocking the nozzle (110), the pin (200) is intervened from the outside of the heating chamber (100). Usually, the pin (200) is guided through an opening (250) on the heating chamber (100), and arranged to, in the passive mode, reach down to the nozzle (110) through the above mentioned molten material. An annular gap remains between circumferential side surfaces around a reciprocation axis of the pin (200), and a circular edge of the opening encircling said side surfaces.

A greater volume of the pin body is introduced into the heating chamber (100) to reach down for blocking the nozzle (110), and as a result the fluid pressure inside the heating chamber (100) increases. Therefore, in operation, the molten material filling the heating chamber (100), inevitably overflows through the annular gap.

The overflown amount of molten material increases at each transition to the passive mode. This phenomenon results in several problems including:
  loss of additive manufacturing ink,
  interruption of the additive manufacturing operation for removing the overflown material to clean the heating chamber (100), before the molten material drips onto an incomplete additive manufacturing product,
  additional maintenance costs in the case where such cleaning process is not performed in time. Primary object of the present invention is to overcome the drawbacks encountered in the prior art. Another object of the present invention is provision of an additive manufacturing device with decreased maintenance costs.

A further object of the present invention is provision of a simplified, robust and low-cost additive manufacturing device with increased service life.

SUMMARY

The present invention relates to a print head for additive manufacturing, in which the movable and delicate nozzle blocking pin, and the opening through which such pin is to be guided, are eliminated.

To achieve this goal, the print head according to the present invention comprises a cover outside the heating chamber. The cover and the heating chamber are movable relative to each other, such that:
  at a first position, the nozzle is covered by the cover, and
  at a second position, the cover and the nozzle are distant from each other, to allow fluid passage from the nozzle.

Figure 1A:
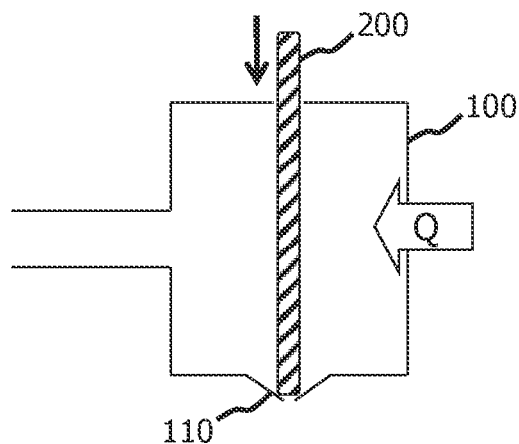
FIG. 1A shows a schematic section view of an exemplary heating chamber known in the related. art, in a passive mode wherein the nozzle is blocked by a pin.
Figure 1B:
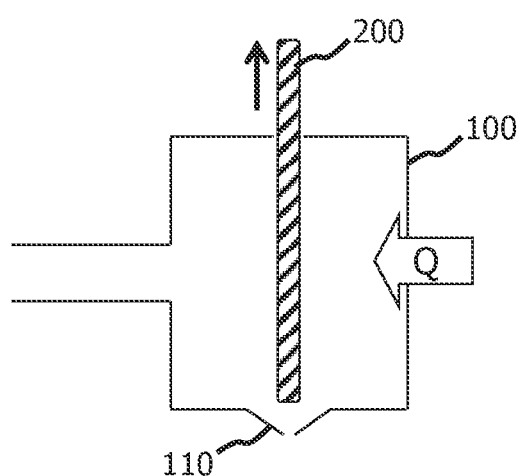
FIG. 1B shows the heating chamber shown in FIG. 1A, in an active mode wherein the nozzle is unblocked by retracting the pin.

REFERENCE SIGNS 1 print head;
10 heating chamber;

11 nozzle;
12 filament inlet;
13 filament supply line;
20 cover;
21 hinge;
100 prior art heating chamber;
110 nozzle of the prior art heating chamber;
200 pin;
β angle;
B 3D printed object;
g gravity vector;
T trajectory;
Q heat;
Z printing zone.

DETAILED DESCRIPTION OF THE EMBODIMENTS

The present invention proposes a print head (1) for additive manufacturing, comprising a heating chamber (10) for melting an additive manufacturing ink (not shown) in the form of a filament. The heating chamber (10) includes a nozzle (11) for extruding molten additive manufacturing ink (not shown). The heating chamber (10) further includes a filament inlet (12) for being connected to a filament supply line (13).

The print head (1) further comprises a cover (20) outside the heating chamber (10) and movable relative to heating chamber (10) between:
  a first position in which the nozzle (11) is covered by the cover (20), and
  a second position in which the cover (20) is distant from the nozzle (11) in which the nozzle (11) is not covered by the cover (20).

Thus, the first position can be considered as a closed (or passive) position in which the nozzle is blocked (wherein the nozzle can be retracted from a printing zone (Z)). The second position can be considered as open position in which the nozzle is unblocked.

The second position can be achieved e.g. by moving the cover (20) away from the nozzle (11), or alternatively by moving the heating chamber (10) away from the cover (20). The latter alternative can be considered as more practical, since at the same time the nozzle (11) can be easily brought to a printing zone (Z) for forming a 3D printed object (B). Accordingly, in a possible embodiment according to the present invention, the heating chamber (10) can be arranged to be movable relative to both of the print head (1) and the cover (20) to transit between the first position and second position.

Translational movements of the cover (20) relative to the print head (1) can be substantially eliminated by arranging that the cover (20) to be fixed/attached to the print head (1). Thus, the number of movable parts can be further minimized for enhancing the service life.

Figure 2A:
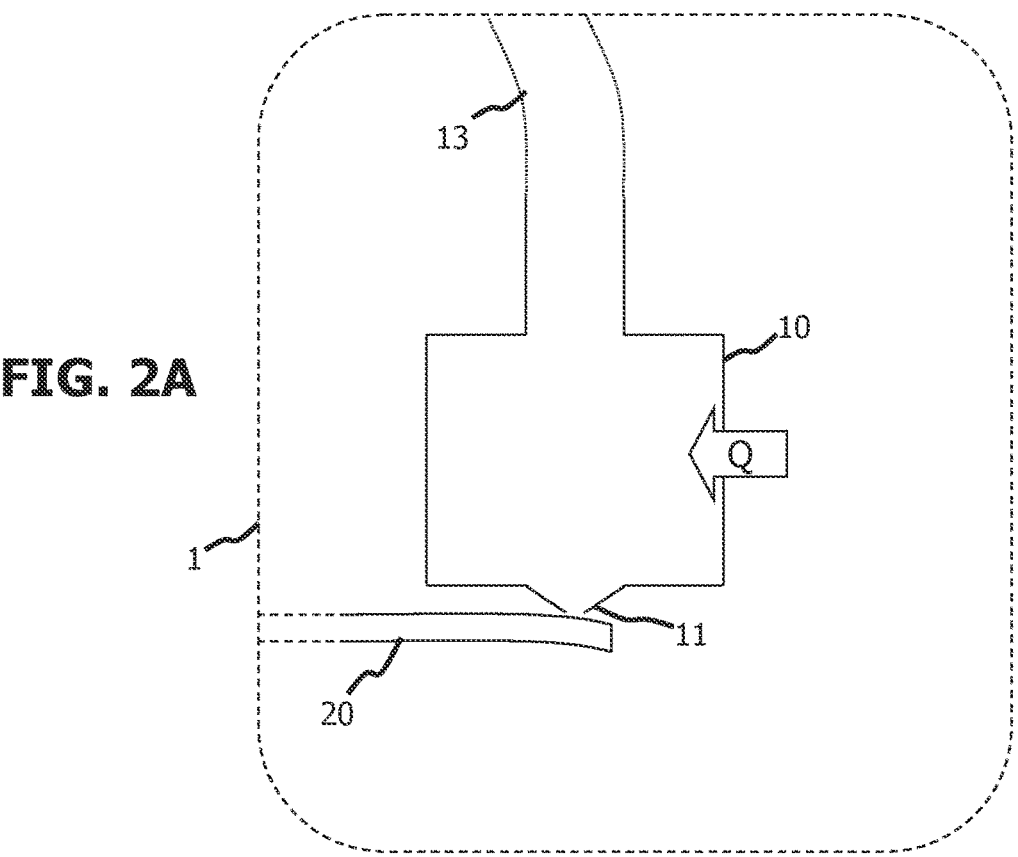
FIG. 2A shows a schematic section view from a first exemplary embodiment of the printing head of an additive manufacturing device according to the present invention, showing a heating chamber and a cover in the printing head, said cover having a flexible surface for being reversibly contacted with the nozzle; in the first position where the nozzle of the heating chamber is blocked by the cover.
Figure 2B:
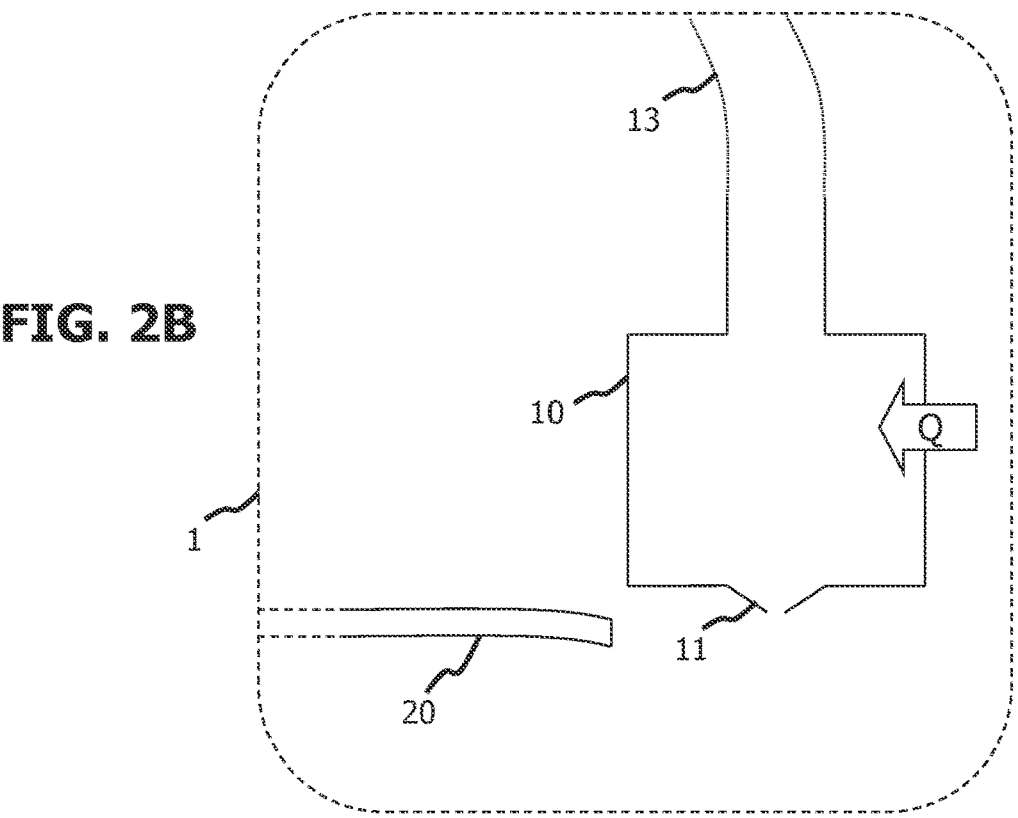
FIG. 2B shows the parts depicted in FIG. 2A, in the second position where the nozzle is distanced away relative to the cover to allow printing.

The cover (20) can include a flexible surface to partly deform at contacting with the nozzle (11) when in the first position. For instance, the flexible surface can include a flexible polymeric material such as rubber, which is a low-cost material. The cover (20) can be substantially in the form of a sheet attached to the print head (1) at one or more edges thereof. For enhancing the simplicity and mechanical flexibility of the cover (20), the same can be attached to the print head (1) at a single edge thereof. FIG. 2A shows a schematic section view from such first exemplary embodiment of the printing head (1) of an additive manufacturing device according to the present invention, showing a heating chamber and a cover in the printing head. Here, the cover (20) has a flexible surface for being reversibly contacted with the nozzle (11), and the cover (20) is in the form of a sheet attached to the print head (1) at a single edge thereof. Here, the print head (10) is in the first position where the nozzle (11) is blocked by the cover (20). FIG. 2B shows the second position where the nozzle (11) is distanced away relative to the cover (20) to allow printing.

Figure 3A:
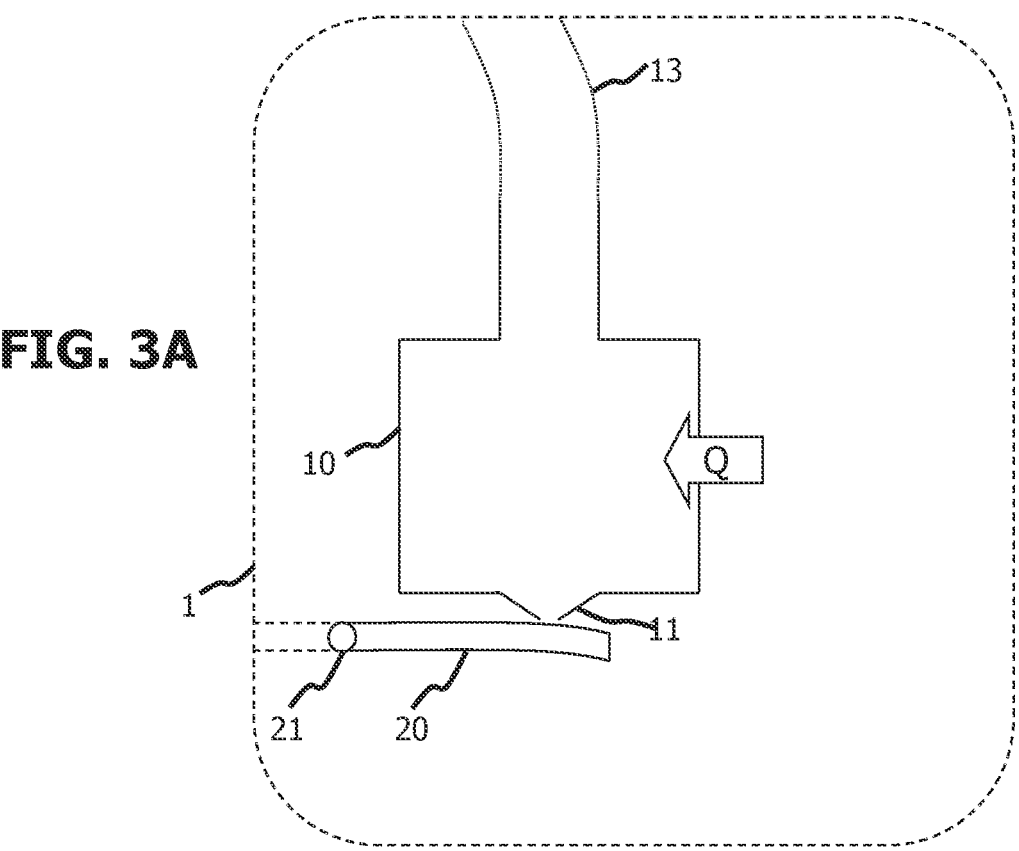
FIG. 3A shows a schematic section view from a second exemplary embodiment of the printing head of an additive manufacturing device according to the present invention, showing a heating chamber and a cover in the printing head, said cover having a substantially rigid surface for being reversibly contacted with the nozzle; in the first position where the nozzle of the heating chamber is blocked by the cover.
Figure 3B:
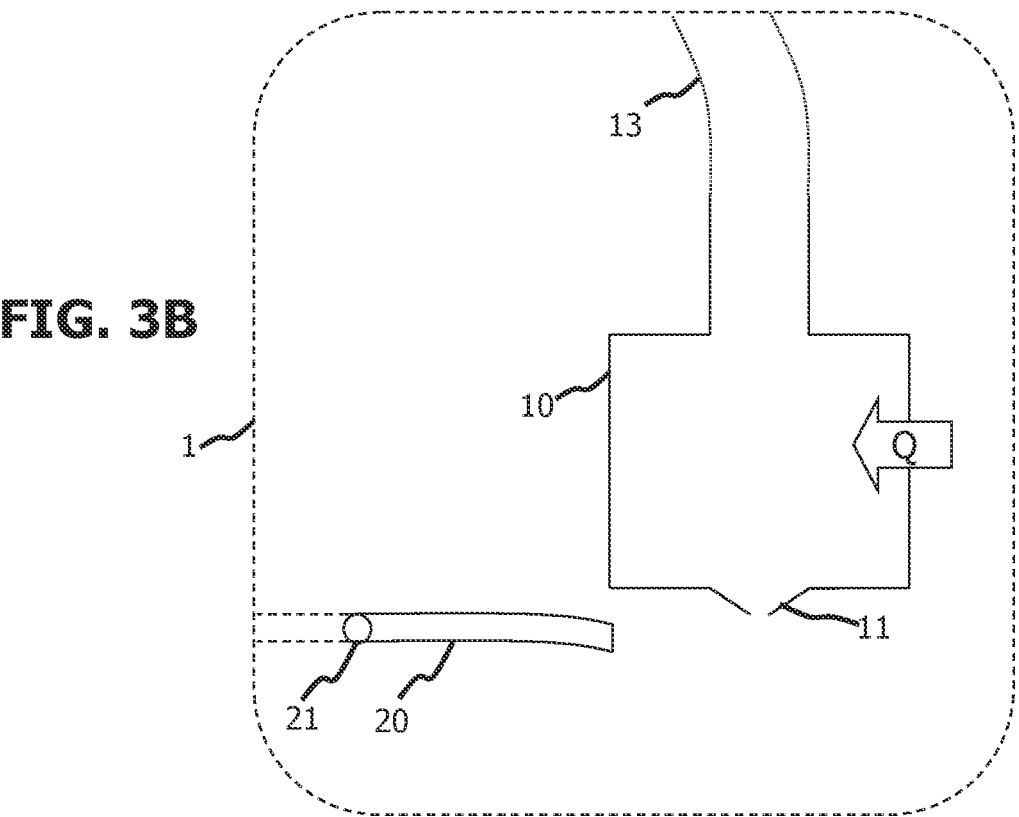
FIG. 3B shows the parts depicted in FIG. 3A, in the second position where the nozzle is distanced away relative to the cover to allow printing.

As an alternative to the above mentioned flexible surface, the cover (20) can have a substantially rigid surface for contacting with the nozzle (11) when in the first position. For a facilitated transition between the first and second positions, the cover (20) can be flexibly hinged to the print head (1) for pivoting at transitions between the first position and the second position. The print head (1) can comprise a hinge (21), which is preferably provided with a resilient member (not shown), for recovering an angle of the substantially rigid surface relative to the print head (1) at transiting from the first position to the second position. For instance, a flexibly hinged connection of the cover (20) can be provided with a torsion spring (not shown) as said resilient member. FIG. 3A shows a schematic section view from such second exemplary embodiment of the printing head (1) of an additive manufacturing device according to the present invention, showing a heating chamber and a cover in the printing head. Here, the print head (1) is in the first position where the nozzle (11) is blocked by the cover (20). FIG. 3B shows the second position where the nozzle (11) is distanced away relative to the cover (20) to allow printing.

The print head (1) can include a plurality of heating chambers (10) coupled with a respective plurality of covers (20). In operation, each heating chamber (10) can be supplied with filaments different from each other. For instance, the print head (1) can include two heating chambers (10) coupled with two respective covers (20).

In a further aspect of the present invention, the heating chamber (10) does not include any further opening allowing the passage of molten additive manufacturing ink from the heating chamber (10).

Figure 4:
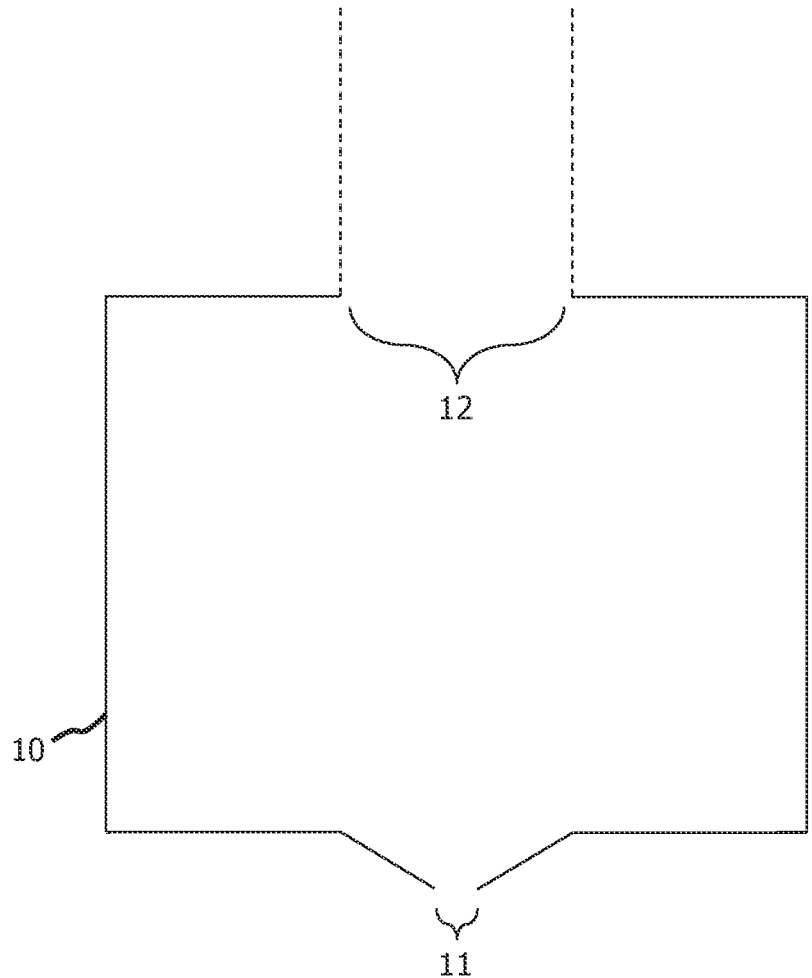
FIG. 4 shows a schematic section view of a heating chamber according to the present invention.

As the nozzle (11) is covered by the cover (20) in the first position, the cover (20) clearly eliminates the necessity to employ any pin for blocking the nozzle (11) from the inside of the heating chamber (10), said pin being guided from the outside of the heating chamber (10). Thus, in the heating chamber (10) according to the present invention, any further opening (for receiving and guiding such pin) is rendered unnecessary. Any leaking of molten filament material from any open areas between an edge of such opening and any such pin are eliminated. FIG. 4 shows a schematic section view of an exemplary heating chamber (10) according to the present invention.

Figure 5:
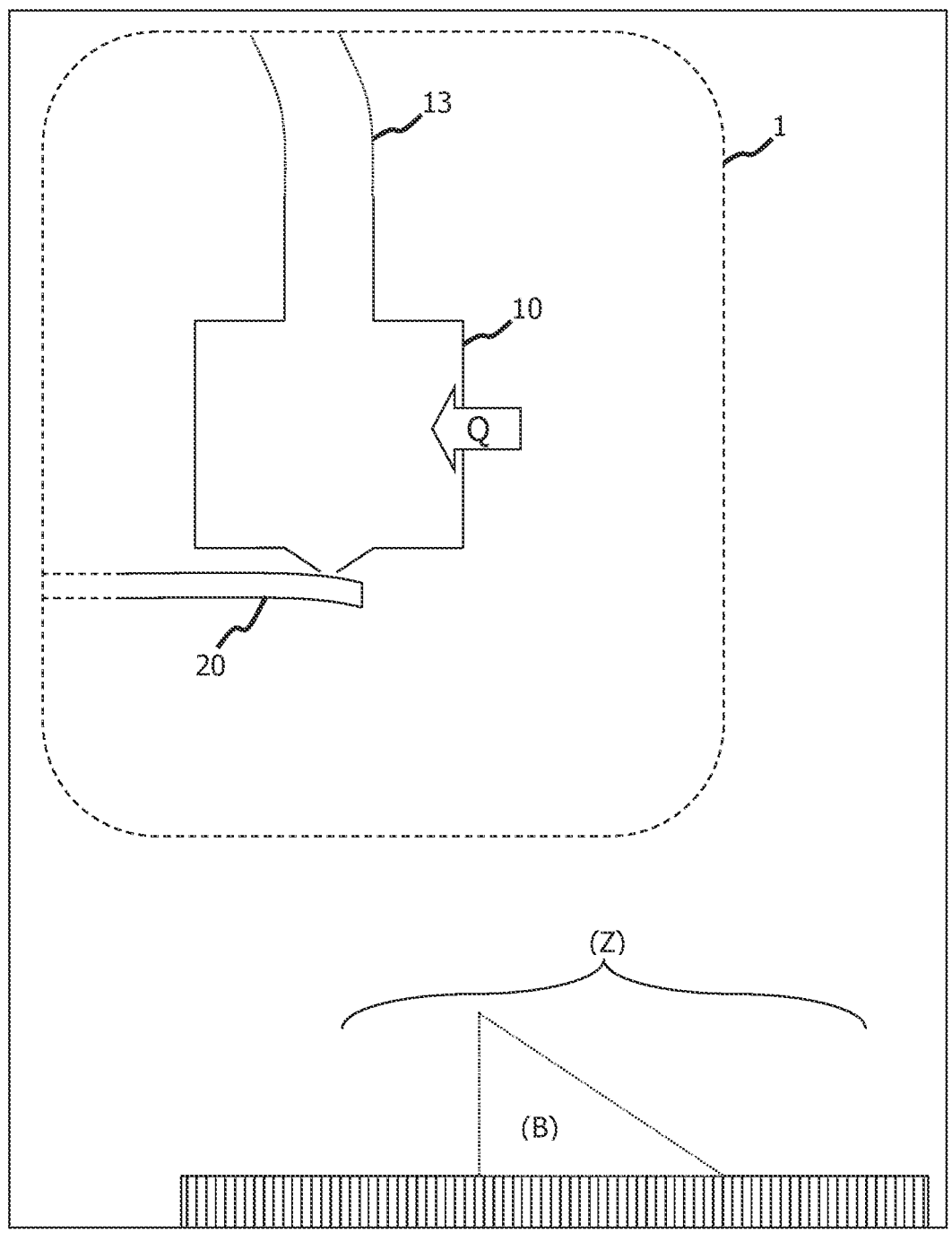
FIG. 5 shows a schematic section view of an additive manufacturing device according to the present invention, in operation (an exemplary 3D printed object is shown at a printing zone), wherein the print head is in the first position.

Accordingly, the present invention further proposes an additive manufacturing device (1000) (i.e. 3D printer) comprising a print head (1) as described above. A schematic side view of an exemplary additive manufacturing device (1000) according to the present invention is depicted in the FIG. 5. In a preferred embodiment of the additive manufacturing device (1000) according to the present invention, which is not limited to a single type of cover (11) within the contexts described above: the print head (1) is arranged to, in operation, guide the heating chamber (10) (thus also the nozzle (11)) along a trajectory (T) at an angle (p) within a range between 15° and 60° relative to a direction of the gravity vector (g). This facilitates the transitions between the first position and the second position, and at the same time, wiping any molten material off the nozzle (11) effectively. Wiping the molten material effectively off results in that, at the end of a printing sequence (by taking the print head to the first position), the molten material is substantially removed from the vicinity of the nozzle, thereby avoiding the molten material from solidification. Considering that a solidified remnant of the material deposited around the nozzle (11) would deform a 3D printed object (B) when the print head (1) is brought to its second position, the present embodiment allows an enhanced fault minimization in operation.

The heating chamber (10) here, is adapted to move "downwards" when transiting from the first position to the second position. For enhancing the effectiveness in said "wiping off", said angle (p) is preferably within a range between 30° and 550; or even more preferably, within a range between 40° and 50°, which is considered to be around 45°.

Figure 6A:
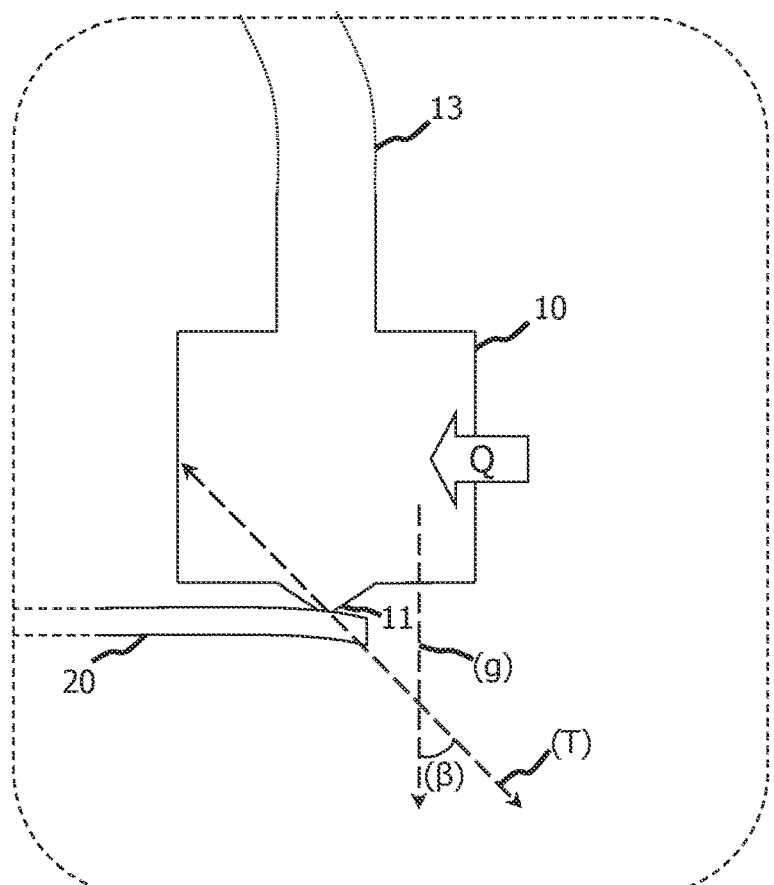
FIG. 6A shows a schematic side section view of a print head in a device for additive manufacturing according to the present invention, in which the heating chamber is guided along a trajectory between the first position and the second position, said trajectory having an oblique angle to the gravity vector; wherein the print head is in the first position.
Figure 6B:
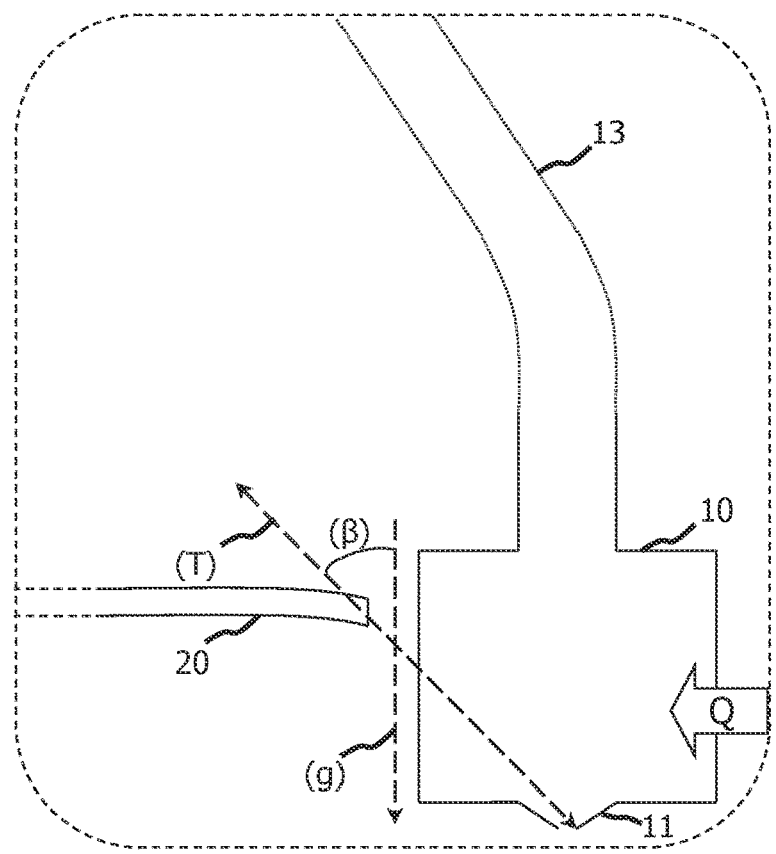
FIG. 6B shows the print head of FIG. 6A, wherein the print head is in the second position.

FIG. 6A shows a schematic side section view of an example to such print head (1), i.e. in which the heating chamber (10) is guided along a trajectory (T) between the first position and the second position, said trajectory having an angle (β) to the gravity vector (g) (here: an oblique angle); wherein the print head (1) is in the first position. FIG. 6B shows the same print head of FIG. 6A, in the second position.

In the drawings, heat directed to the heating chamber (10) (100, for prior art heating chamber) is symbolized with "Q" with a bold arrow.

The above described heating chamber (10), the print head (1) enabled with such heating chamber (10), and the 3D printer with such print head (1) bear the advantages of: overcoming the drawbacks encountered in the prior art; decreased maintenance costs; and simplification of equipment, robustness, cost reduction and increased service life.

What is claimed is:

1. A print head for additive manufacturing, comprising a heating chamber for melting a filament a filament to obtain a molten material, wherein the heating chamber comprises:
   a nozzle for extruding the molten material, and
   a filament inlet for being connected to a filament supply line;

wherein the print head further comprises a cover outside the heating chamber and the cover is movable relative to the heating chamber between a first position and a second position, wherein
   in the first position, the nozzle is covered by the cover, and
   in the second position, the cover is distant from the nozzle and the nozzle is not covered by the cover,
   the cover comprises a flexible surface to partly deform at contacting with the nozzle when in the first position,
   the flexible surface comprises a flexible polymeric material.

2. The print head according to the claim 1, wherein the heating chamber is movable relative to both of the print head and the cover to transit between the first position and the second position.

3. The print head according to claim 1, wherein the cover is fixed to the print head.

4. The print head according to the claim 1, wherein the cover is in a form of a sheet, wherein the cover is attached to the print head at one or more edges of the cover.

5. The print head according to the claim 4, wherein the cover is attached to the print head at a single edge of the cover.

6. The print head according to claim 1, comprising a plurality of heating chambers coupled with a respective plurality of covers.

7. The print head according to claim 1, wherein the print head is arranged to, in operation, guide the nozzle along a trajectory at an angle within a range between 15° and 60° relative to a direction of a gravity vector.

8. The print head according to the claim 7, wherein the angle is within a range between 30° and 55°.

9. The print head according to claim 1, wherein the heating chamber does not comprise any further opening allowing a passage of the molten material from the heating chamber.

10. A device for an additive manufacturing, wherein the device is provided with the print head according to claim 1.

11. The print head according to claim 2, wherein the cover is fixed to the print head.

12. The print head according to claim 1, wherein the flexible surface comprises rubber.

* * * * *